April 10, 1951   C. EAMES   2,548,470
LAMINATED SPLINT
Original Filed May 28, 1942   3 Sheets-Sheet 1
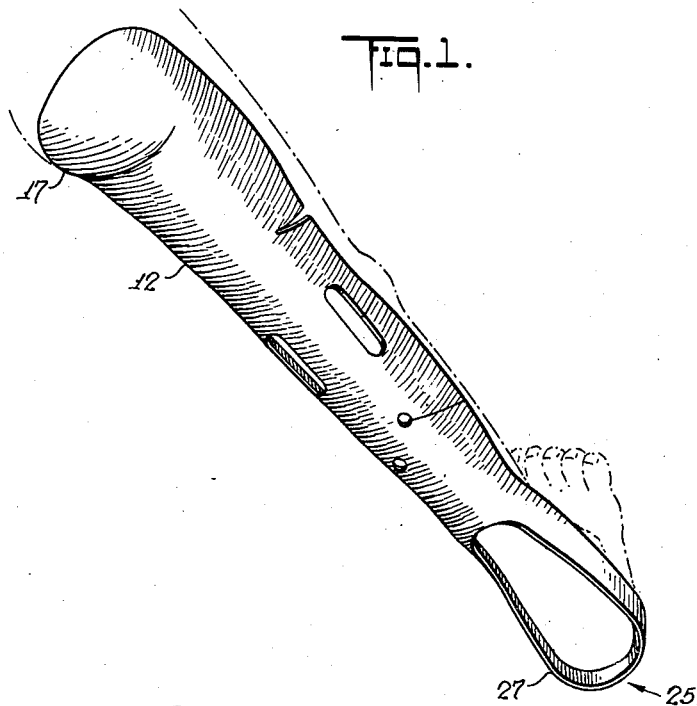
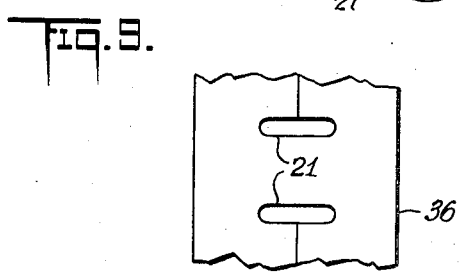
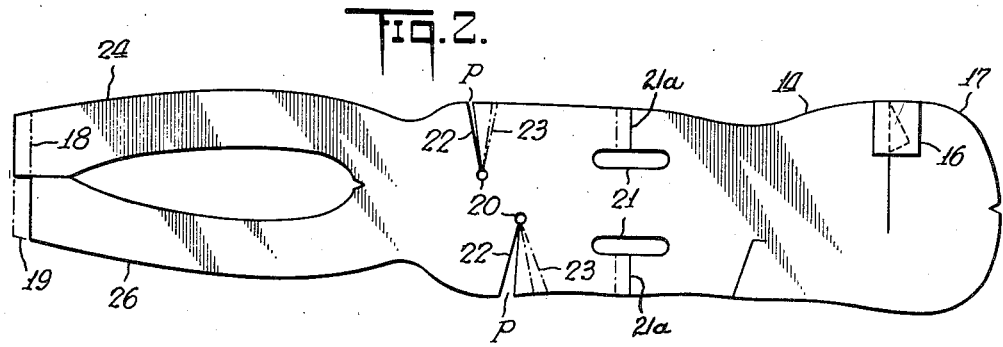
INVENTOR
Charles Eames
BY
Blair Curtis & Hayward
ATTORNEYS April 10, 1951        C. EAMES        2,548,470

LAMINATED SPLINT

Original Filed May 28, 1942        3 Sheets-Sheet 2

INVENTOR
Charles Eames
BY
Blair Curtis & Hayward
ATTORNEYS

April 10, 1951   C. EAMES   2,548,470
LAMINATED SPLINT

Original Filed May 28, 1942   3 Sheets-Sheet 3

INVENTOR
*Charles Eames*
BY
*Blair Curtis & Hayward*
ATTORNEYS

Patented Apr. 10, 1951

2,548,470

UNITED STATES PATENT OFFICE 2,548,470

LAMINATED SPLINT

Charles Eames, West Los Angeles, Calif., assignor, by mesne assignments, to Herman Miller Furniture Company, Zeeland, Mich., a corporation of Michigan Original application May 28, 1942, Serial No. 444,774. Divided and this application February 25, 1946, Serial No. 649,853

10 Claims. (Cl. 128—89)

This invention relates to laminated constructions and articles; it is a division of my copending application Serial No. 444,774, filed May 28, 1942, which matured into Patent Number 2,395,468 on February 26, 1946. It concerns particularly laminated articles having surfaces conforming to compound curves. (NOTE: In the following, by a compoundly curved surface is meant a surface presenting a two dimensional curve, such as a spherically shaped surface, as distinguished from a unidimensional curve, such as a cylindrically curved surface.)

One object of the invention is to provide an improved surgical splint. Another object is to provide an improved chair. Yet another object is the provision of an improved stretcher. A further object resides in the provision of an easily manufactured laminated construction having compoundly curved configurations of predetermined designs. Additional objects will be in part pointed out as the description proceeds and will in part become apparent therefrom.

One example of the laminated materials herein referred to is plywood. Plywood has been used in varying thicknesses in airplanes, furniture, boxes, houses, and certain other structures. In some instances it has been bent into curved configurations for use, for example, in airplane wings and fuselages or in the seats and backs of folding chairs. Heretofore, the use of curved sheets of plywood has been limited primarily to articles wherein, at any point on the surface, one element of the surface was a straight, or very nearly straight, line or, in other words, wherein the surface of the article substantially conformed to a surface generated by a straight line moving along a curve and remaining parallel to itself. Recently it has become known that plywood could in some instances be molded to conform to a limited extent to more irregular, compoundly curved surfaces, such as those generated by a curved line moving through space along a curve. Such compound curves heretofore were fabricated from sheets of plywood only through the use of expensive dies operating under relatively great pressures and then usually only with some sacrifice to the quality of the finish of the wood in the molded surfaces.

My earlier application above mentioned discloses and claims methods whereby compoundly curved surfaces in plywood and laminated articles are made possible without the use of high pressures or expensive dies and without deleterious effects on the wood surfaces. In the present application I have claimed certain articles and laminated constructions which can be readily produced by my prior methods.

In the drawings, in which several embodiments of the invention are illustrated:

Figure 1 is a perspective view of a surgical splint embodying the invention;

Figure 2 is a plan view of a veneer for the splint showing the general pattern of the laminae from which the splint is fabricated;

Figure 5:
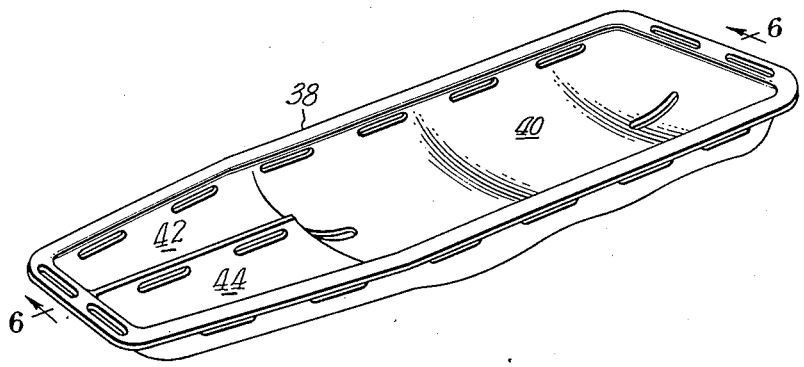
Figure 5 is a perspective view of a stretcher embodying the invention.
Figure 6:
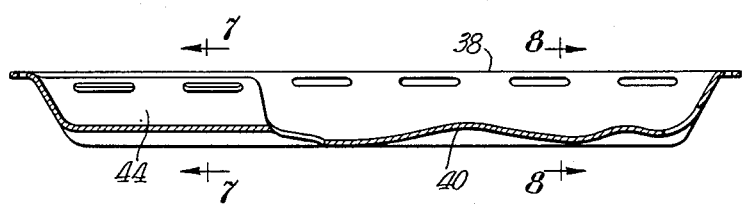
Figure 7:
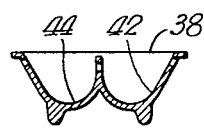
Figure 8:
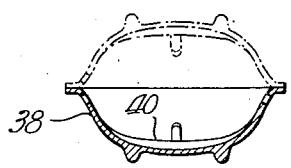

Figures 6, 7 and 8 are sectional views of the stretcher of Figure 5 taken in the direction of the arrows along the lines 6—6, 7—7 and 8—8 respectively; and, Figure 9 is a plan view of a reinforcing member.

The splint, indicated by 12 (Figure 1) is fabricated from layers of wood veneer. The veneers are cut according to a pattern to form blanks, such as the blank 14 shown in Figure 2, and each blank is so cut from the veneer sheeting that the grain of the wood in each runs in a different direction. The blank 14 (Figure 2) is provided with cut-out portions as indicated by P. These portions are located and proportioned in relation to the location and configuration of the desired compoundly curved shapes of the finished article. Each portion P is adapted to provide a dome-like contour, the top of the dome corresponding generally to the location of an opening 20 and the character of the dome depending upon the shape of a dart-shaped part 22. If the height of the dome is to be slight, the dart removed is quite narrow at its broadest point; if the height of the dome is to be not so slight, the dart removed is wider at its base. In the form illustrated the dart-shaped parts removed have been given generally straight side lines. These lines may in some instances be arcuate or irregular, depending upon the shape of the surface desired. Some of the cut-out portions include specially formed openings 21 which are connected by cuts 21a (see Figure 2) with outer edges of the veneers.

For any given compoundly curved portion the dart in each veneer is angularly displaced somewhat with respect to the corresponding dart of the next adjacent veneer (as indicated in dotted lines by 23) so that, when the edges of a given dart are brought into juxtaposition during the molding to form a seam, no seam directly overlies another seam. The overlapping joint thus formed is substantially as strong as any other portion of the splint. Similarly, ends 24 and 26 of each veneer are cut to give an interlocking, overlapping joint, as at 25 (Figure 1), when they are combined during the molding to form stirrup 27 of the splint. Dotted lines 18 and 19 indicate where portions 24 and 26 might be cut in alternate blanks to provide for joint 25. A patch 16 allows for expansion of the upper portion 17. The patch may be varied through the several layers to avoid bulkiness.

The splint illustrated combines strength with light weight in a member which will afford support, including traction, to an entire leg. The embodiment described has a weight of a scant 700 grams and a series of splints may be nested together for compact storage or easy transportation.

Figure 3:
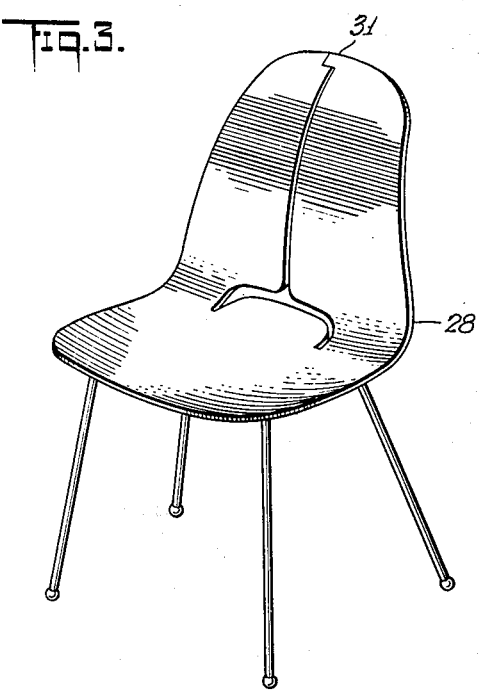
Figure 3 is a perspective view of a chair embodying the invention.
Figure 4:
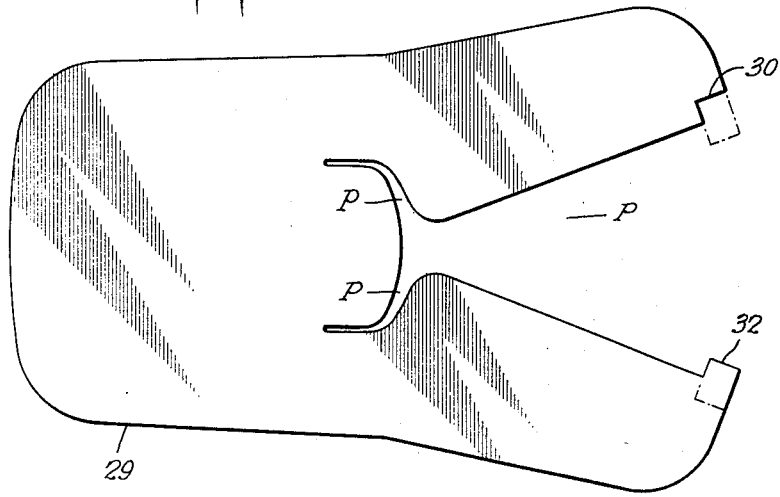
Figure 4 is a plan view of a veneer for the chair showing the general pattern of the laminae from which the chair is fabricated.

Figure 3 illustrates a molded plywood chair 28. The pattern 29 of the blanks used in making the chair appears in Figure 4 and shows how cut-out portions P may be combined. In this instance, three portions P have been incorporated in a veneer which may be accurately shaped to conform to the contours of a person who is to occupy the chair. Sections 30 and 32 of the blanks, for a given chair, would be displaced somewhat with respect to one another, as shown in dotted lines, so that they would interfit to make a solid frame over the top of the chair back, with the opposing edges of sections 30 and 32 of any one veneer coming together in off-set relationship to that of the corresponding sections of adjacent veneers to provide a strong, smooth joint, as at 31 (Figure 3).

The chair is very light in weight and, at the same time, because of the almost unlimited configurations to which such chairs may be conformed, it gives the maximum comfort and freedom of movement necesary to use in such locations as, for example, in airplanes.

The stretcher, shown in Figures 5, 6, 7 and 8 and indicated generally by numeral 38, is another example of a product embodying the invention. It may be fabricated from veneers cut in accordance with a pattern. A fitted body section 40 and fitted leg sections 42 and 44 are all made possible through the skillful location and combination of cut-out portions in the blanks.

The stretcher is strong, light in weight, and, because of its scientifically proportioned surfaces, provides proper support for each member of the body without additional pads, rubber sheets, and the like, previously necessary in the field with known stretchers, and any number of them may be nested together with the result that they make for an economy of space and for easy transportation. Further, the stretcher is waterproof and can float while bearing a man. It acts as a complete splint in itself to immobilize any part of the body, conserves body heat, and, when covered by a second, inverted stretcher (as indicated by dotted lines in Figure 8) assists in keeping out rain, snow or insects and affords protection generally from exposure and from the rough handling which inevitably accompanies movements such as from one ship to another or through heavy underbrush.

Figure 9 depicts a means for strengthening a selected section of an article made in accordance with the invention. Piece 36 is adapted to be inserted between layers of the article to be reinforced. The strength of an article may be increased over a desired area by the insertion of reinforcing pieces such as piece 36. The reinforcements may occur in a compound surface, in which event they may include cut-out portions such as P (Figure 2) so that they may be easily shaped along with the other laminae. Several reinforcements may be inserted over the same area and they may even be used to give slight changes in the contour of the surface of the article. Best results are obtained by tapering the edge portions of the reinforcing piece so that the adjacent laminae will flow smoothly over the piece.

As pointed out in my earlier application the various specially cut blanks of the invention lend themselves peculiarly well to being cemented and molded so that only low pressures and temperatures are required to make the laminae conform to a molding die while the cement is setting. The old concept of male and female die surfaces may be done away with entirely. The use of low pressure has the advantage of eliminating the impaired exterior surfaces which heretofore resulted from attempts to mold compoundly curved surfaces in plywoood articles.

Since many embodiments of the invention are possible and since many changes might be made in the embodiments set forth, protection is not to be limited to anything described or presented in the above specification and drawings but only to the scope of the hereinafter attached claims.

I claim:

1. As an article of manufacture a surgical leg splint, said splint including: a stirrup portion and a leg portion, said portions being molded to such accurate configurations that a leg therein may be afforded both support and traction, said splint comprising a laminated material formed of wood veneers and weighing on the order of approximately 700 grams, whereby a wearer of the splint is not unduly burdened by its mass, said molded configurations being provided in said material by compoundly curved surfaces, whereby the splint not only is made to follow more accurately the contours of a wearer's leg but also the splint is given great structural strength, said compoundly curved surfaces being provided for by darts cut in the veneers of the laminated material, whereby the material may be accurately and smoothly molded by the application of relatively small forces.

2. The invention of claim 1 wherein the dart cut from one veneer is angularly displaced with respect to the dart cut from another, adjacent veneer, whereby the veneer edges formed by the removal of the dart from the one veneer do not overlie the veneer edges formed by the removal of the dart from the other veneer.

3. In a sheet-like article of manufacture, a compoundly curved, dome-like surface conforming to a selected configuration; said sheet-like article being composed of veneers of wood bonded together in laminar relationship, each of a plurality of such veneers including an opening therethrough and spaced from its peripheral boundary and only one cut extending from each such opening to said boundary.

4. In a sheet-like article of manufacture, a compoundly curved, dome-like surface conforming to a selected configuration; said sheet-like article being composed of veneers of wood bonded together in laminar relationship, each of a plurality of such veneers including an opening therethrough and spaced from its peripheral boundary and only one cut extending from each such opening to said boundary and having its edges in substantial abutment, the said openings in a plurality of said laminar veneers being aligned with one another.

5. In a sheet-like article of manufacture, a compoundly curved, dome-like surface conforming to a selected configuration; said sheet-like article being composed of veneers of wood bonded together in laminar relationship, each of a plurality of such veneers including an opening therethrough and spaced from its peripheral boundary and only one cut extending from each such opening to said boundary and the cuts of a plurality of such laminar veneers being disaligned.

6. In a sheet-like article of manufacture, a compoundly curved, dome-like surface conforming to a selected configuration; said sheet-like article being composed of veneers of wood bonded together in laminar relationship, each of a plurality of such veneers including an opening therethrough and spaced from its peripheral boundary and only one cut extending from each such opening to said boundary and a veneer patch interleaved with the veneers to overlap a cut and reinforce the article.

7. In a sheet-like article of manufacture, a compoundly curved, dome-like surface conforming to a selected configuration; said sheet-like article being composed of veneers of wood bonded together in laminar relationship, each veneer including an opening therethrough and spaced inwardly from its edge and only one cut extending from said opening to its edge, the various openings in the various veneers being aligned with one another and being located adjacent the top of said dome-like surface, and the various cuts of the various veneers being disaligned.

8. An article of manufacture comprising a dome-like surface of sheet-like material and composed of veneers of wood bonded together in laminar relationship, each of a plurality of such veneers including an opening therethrough spaced inwardly from its edge and having only one dart-like cut-out portion with its apex extending into said opening and extending therefrom to said edge, the edges of said cut-out portion being in substantial abutment whereby the wood of said veneer is stressed and deformed into a non-planar form.

9. In a sheet-like article of manufacture, a compoundly curved, dome-like surface conforming to a selected configuration; said sheet-like article being composed of veneers of wood bonded together in laminar relationship, each veneer including an opening and a cut-out portion extending from said opening to the edge of the veneer but leaving the veneer as one piece of wood, the various openings in the various veneers being aligned with one another and being located adjacent the top of said dome-like surface, and the various cut-out portions of the various veneers being disaligned.

10. In a sheet-like article of manufacture, a compoundly curved, dome-like surface conforming to a selected configuration; said sheet-like article being composed of veneers of wood bonded together in laminar relationship, each of a plurality of such veneers including an opening and a gore-like cut-out portion having its apex communicating with said opening and extending to the edge of the veneer which is one integral piece of wood, a plurality of said openings being aligned with one another, and in each such veneer the side edges of the cut-out portion of that veneer being drawn together to form substantially meeting edges and to stress and deform the veneer into a curved dome-like shape, and the substantially meeting edges of the plurality of such veneers being disaligned.

CHARLES EAMES.

REFERENCES CITED

The following references are of record in the file of this patent:

UNITED STATES PATENTS

| Number | Name | Date |
|---|---|---|
| 262,956 | Kukkuck et al. | Aug. 22, 1882 |
| 275,499 | Kukkuck et al. | Apr. 10, 1883 |
| 416,505 | Schnabel | Dec. 3, 1889 |
| 525,046 | Deuther | Aug. 28, 1894 |
| 649,718 | Deuther | May 15, 1900 |
| 683,908 | Buyten | Oct. 8, 1901 |
| 1,010,706 | Tonjis | Dec. 5, 1911 |
| 1,365,835 | Lepere | Jan. 18, 1921 |
| 1,385,387 | Morandi | July 26, 1921 |
| 1,642,066 | Gibson | Sept. 13, 1927 |
| 1,912,931 | Clay | June 3, 1933 |
| 1,926,301 | Osgood | Sept. 12, 1933 |
| 2,141,100 | Warden | Dec. 20, 1938 |
| 2,312,332 | Gramelspacher | Mar. 2, 1943 |
| 2,407,711 | Luth | Sept. 17, 1946 |